A. ROBERTSON.
Improvement in Preserving and Smoking Meats.
No. 114,972.  Patented May 16, 1871.
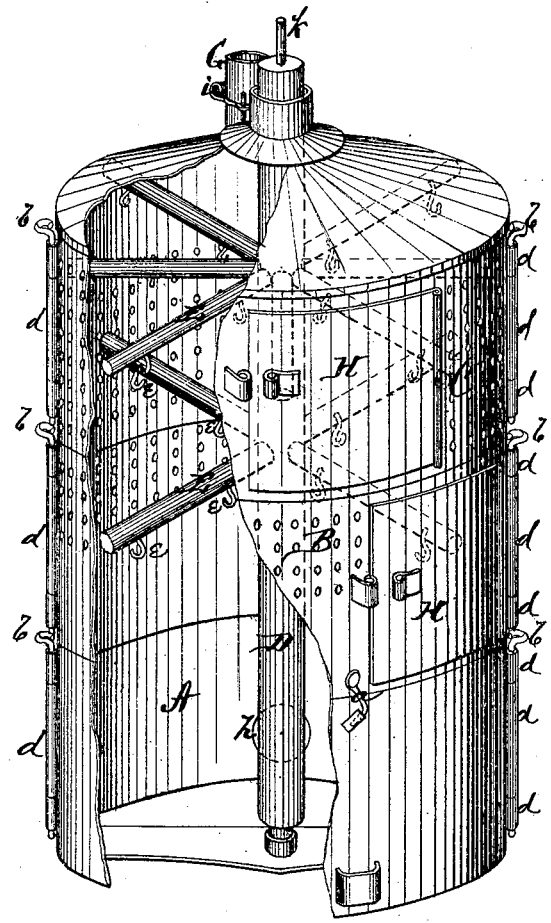

United States Patent Office.

ABSALOM ROBERTSON, OF SEYMOUR, INDIANA.

Letters Patent No. 114,972, dated May 16, 1871.

---

IMPROVEMENT IN PRESERVING AND SMOKING MEATS.

---

The Schedule referred to in these Letters Patent and making part of the same.

---

*To all whom it may concern:*

Be it known that I, ABSALOM ROBERTSON, of Seymour, in the county of Jackson and State of Indiana, have invented certain new and useful Improvements in Apparatus for Smoking and Preserving Meat; and I do hereby declare that the following is a full, clear, and exact description thereof, reference being had to the accompanying drawing and to the letters of reference marked thereon which form a part of this specification.

The nature of my invention consists in the construction and arrangement of an apparatus by which meat can be smoked, and, without moving, preserved from insects and animals, such as rats, mice, &c.

In order to enable others skilled in the art to which my invention appertains to make and use the same, I will now proceed to describe its construction and operation, referring to the annexed drawing, which represents a perspective view of my apparatus partly broken open to show its interior arrangement.

My apparatus is made of sheet-iron, in the form of a round or cylindrical house, and is composed of a series of horizontal sections, A B C, having suitable shoulders overlapping each other, and held together by hooks $a$ $a$, as shown.

Each of these sections is then made in two or more vertical sub-sections fastened together by means of pins $b$ $b$, passing vertically through loops $d$ $d$, formed on the edges of said sub-sections.

The upper sections B and C are perforated so as to admit air and yet keep out all insects which trouble meat.

Through the center of the house thus constructed passes an upright revolving shaft, D, with arms E E, having hooks $e$ $e$ for the purpose of hanging the meat on.

$h$ is a circular pipe, through which smoke is introduced to the meat by connection with a fire-box or stove.

On the top of the house is a ventilation-tube, G, with a valve, $i$, to retain the smoke or let it pass off at pleasure.

The journal or pin $k$, in the upper end of the revolving shaft D, is intended to run in a beam or joist in the house, where it sits to hold it steady.

Access to the meat is gained through doors H H in the upper perforated sections B and C.

The construction of this house makes it very easy to take apart, and convenient for transportation.

Having thus fully described my invention,

What I claim as new, and desire to secure by Letters Patent, is—

1. The within-described meat-house, composed of horizontal sheet-iron sections, the upper ones perforated and provided with suitable doors, and each such horizontal section divided into two or more sub-sections, the whole being arranged and connected together substantially as and for the purposes herein set forth.

2. The inlet-pipe $h$ and ventilation-tube G, with valve $i$, arranged as described in the sectional meat-house A B C, substantially as and for the purposes herein set forth.

In testimony that I claim the foregoing as my own I affix my signature in presence of two witnesses.

ABSALOM ROBERTSON.

Witnesses:
A. FROST,
M. F. BATTORFF.